United States Patent
Brackman et al.

(10) Patent No.: US 9,342,135 B2
(45) Date of Patent: May 17, 2016

(54) ACCELERATED THERMAL MITIGATION FOR MULTI-CORE PROCESSORS

(71) Applicant: QUALCOMM Incorporated, San Diego, CA (US)

(72) Inventors: David Samuel Brackman, San Diego, CA (US); Sumeet Singh Sethi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 334 days.

(21) Appl. No.: 14/052,191

(22) Filed: Oct. 11, 2013

(65) Prior Publication Data

US 2015/0106640 A1    Apr. 16, 2015

(51) Int. Cl.
*G06F 1/32* (2006.01)
*G06F 1/20* (2006.01)
*G06F 9/50* (2006.01)

(52) U.S. Cl.
CPC .............. *G06F 1/3287* (2013.01); *G06F 1/206* (2013.01); *G06F 1/3243* (2013.01); *G06F 9/5094* (2013.01); *Y02B 60/1239* (2013.01); *Y02B 60/1275* (2013.01); *Y02B 60/1282* (2013.01); *Y02B 60/142* (2013.01)

(58) Field of Classification Search
CPC ..... G06F 1/206; G06F 1/3206; G06F 1/3243; G06F 1/3287
USPC .......................................... 713/320, 323, 324
See application file for complete search history.

(56) References Cited

U.S. PATENT DOCUMENTS

| | | | |
|---|---|---|---|
| 7,451,332 B2* | 11/2008 | Culbert | G06F 1/206 713/300 |
| 7,584,369 B2* | 9/2009 | Capps, Jr. | G06F 1/206 709/201 |
| 7,617,403 B2* | 11/2009 | Capps, Jr. | G06F 1/206 700/12 |
| 7,949,887 B2 | 5/2011 | Gunther et al. | |
| 7,962,774 B2 | 6/2011 | Chakraborty et al. | |
| 8,064,197 B2 | 11/2011 | Mowry et al. | |
| 8,214,660 B2* | 7/2012 | Capps, Jr. | G06F 1/206 702/130 |
| 2006/0095911 A1 | 5/2006 | Uemura et al. | |
| 2011/0093733 A1* | 4/2011 | Kruglick | G06F 1/3203 713/340 |
| 2011/0145605 A1* | 6/2011 | Sur | G06F 1/206 713/300 |
| 2011/0172984 A1 | 7/2011 | Cher et al. | |
| 2012/0146708 A1 | 6/2012 | Naffziger et al. | |
| 2012/0166839 A1 | 6/2012 | Sodhi et al. | |
| 2012/0179441 A1 | 7/2012 | Anderson et al. | |
| 2013/0079946 A1 | 3/2013 | Anderson et al. | |
| 2013/0086395 A1* | 4/2013 | Liu | G06F 9/5094 713/300 |
| 2014/0075223 A1* | 3/2014 | Tan | G06F 1/3243 713/322 |

OTHER PUBLICATIONS

International Search Report and Written Opinion from International Application No. PCT/US2014/059113, dated Dec. 18, 2014, 12 pp.
International Preliminary Report on Patentability from International Application No. PCT/US2014/059113, mailed Jan. 21, 2016, 8 pp.

* cited by examiner

*Primary Examiner* — Chun Cao
(74) *Attorney, Agent, or Firm* — Shumaker & Sieffert, P.A.

(57) ABSTRACT

A temperature sensor may sense the temperature of a multi-core processor. In response to the temperature of the multi-core processor exceeding a temperature threshold for the multi-core processor, one or more busy processor cores of the multi-core processor may be power collapsed without reducing clock speed of the multi-core processor.

26 Claims, 5 Drawing Sheets

ACCELERATED THERMAL MITIGATION FOR MULTI-CORE PROCESSORS

TECHNICAL FIELD

This disclosure relates to temperature management for multi-core processors.

BACKGROUND

During use, a multi-core processor, such as a multi-core graphics processing unit (GPU) or a multi-core central processing unit (CPU), may dissipate heat as the multi-core processor processess computer instructions. The heat produced by the processor cores may include heat produced by dynamic power dissipation and static leakage. Dynamic power dissipation may be heat generated by the charging and discharging of transistors of the processor as the processor processes computer instructions, and static leakage may be heat generated from gate leakage and other leakage currents that flow when the processors are powered on, even when transistors of the processor are not in use (e.g., when the processors are powered on but idle). Because multi-core processors may be capable of more performance than their thermal envelopes, or the maximum power draw allowed by the processors, thermal mitigation strategies may be implemented to prevent the processors from overheating.

SUMMARY

In general, aspects of the present disclosure describe techniques for accelerated thermal mitigation of multi-core processors that have exceeded their thermal envelope. A multi-core processor having a temperature that is higher than its temperature threshold can have its temperature return quickly below the temperature threshold while preserving more of its processing power by power collapsing one or more busy processor cores without changing the clock and/or voltage.

In one example, a method for thermally mitigating a multi-core processor includes power collapsing one or more busy processor cores of a multi-core processor without reducing clock speed of the multi-core processor in response to a temperature of the multi-core processor exceeding a temperature threshold.

In another example, an apparatus includes a multi-core processor and a power control module configured to power collapsing one or more busy processor cores of the multi-core processor without reducing clock speed of the multi-core processor in response to a temperature of the multi-core processor exceeding a temperature threshold.

In another example, a an apparatus includes means for sensing a temperature of a multi-core processor and means for power collapsing one or more busy processor cores of the multi-core processor without reducing clock speed of the multi-core processor in response to a temperature of the multi-core processor sensed by the means for sensing the temperature of the multi-core processor exceeding a temperature threshold.

In another example, a computer-readable medium, such as a computer-readable storage medium, stores instructions that, when executed, cause one or more programmable processors to power collapse one or more busy processor cores of a multi-core processor without reducing clock speed of the multi-core processor in response to a temperature of the multi-core processor exceeding a temperature threshold.

The details of one or more examples are set forth in the accompanying drawings and the description below. Other features, objects, and advantages will be apparent from the description and drawings, and from the claims.

DETAILED DESCRIPTION

Some potential approaches to thermally mitigate a multi-core processor may include reducing the clock rate and the voltage levels for the processor cores when the temperature of the processor exceeds a temperature threshold. Once the temperature of the processor returns to a normal level, the original clock rate and voltage levels for the processor can be restored. However, because the clock for the processor cores of the processor is typically also the clock used by other components of the processor besides the processor cores, such as memories and caches on the processor, reducing the clock rate of the processors will also reduce the performance of these components. In addition, while reducing the clock rate and the voltage levels may reduce dynamic power dissipation, such an approach does not mitigate heat caused by static leakage.

Accordingly, aspects of the present disclosure includes power collapsing (i.e., turning off) one or more cores of a multi-core processor when a temperature threshold is exceeded without reducing the clock rate or voltage levels for the processor. The temperature threshold may be lower than an emergency threshold, which may be a temperature threshold above which the processor may be damaged by the heat. The cores that are power collapsed may be busy cores, in that the cores are actively performing instructions. Power collapsing busy cores of the processor reduces both dynamic power dissipation and static leakage while providing increased performance relative to previous approaches of reducing the clock rate and voltage levels because other components of the processor, such as memories and caches, can continue to run at a normal non-reduced clock rate. For example, in a four-core processor where all four cores of the processor are in use, power collapsing two of the cores so that only two of the four cores continue to operate may provide better performance than reducing the clock speed of the processor by 50%. In addition, power collapsing busy cores may allow the processor to cool more quickly so that its temperature returns to below the temperature threshold much faster than the previously proposed solution of reducing the clock rate and voltage because, as discussed above, power collapsing cores reduces both the dynamic power and the static leakage of the disabled cores.

Figure 1:
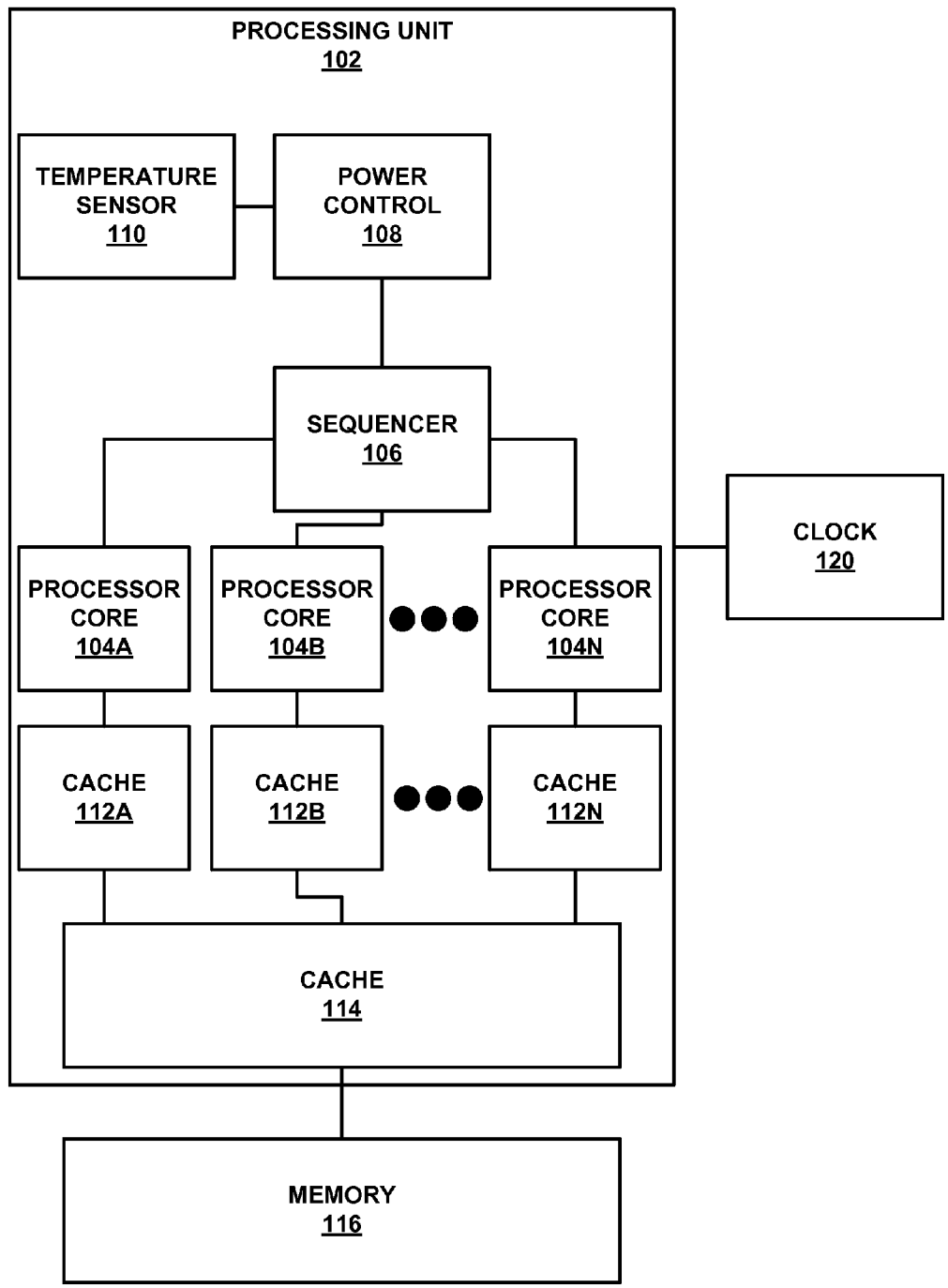
FIG. 1 is a block diagram illustrating an example processor unit that includes a multi-core processor where one or more busy cores can be stopped for thermal mitigation according to some aspects of the present disclosure.

FIG. 1 is a block diagram illustrating an example processor unit that includes a multi-core processor where one or more busy cores can be stopped for thermal mitigation according to some aspects of the present disclosure. As shown in FIG. 1, processing unit 102 may include a plurality of processor cores 104A-104N (hereafter "processor cores 104"). In some examples, processor cores 104 may be included in a single integrated circuit die. In other examples, processor cores 104 may be included in multiple integrated circuit dies in a single chip package. Processing unit 102 may be a multi-core microprocessor because processing unit 102 includes a plurality of processor cores 104. Processing unit 102, in some examples, may be a microprocessor, such as a central processing unit (CPU) configured to process instructions of a computer program for execution, or may be a graphics processing unit (GPU) configured to process graphics processing instructions to render a graphical scene at a display (not shown).

Each processor core of processor cores 104 may be associated with one or more of caches 112A-112N (hereafter "caches 112"). In some examples, caches 112 may be L1 cache that provides a first level of caching for processor cores 104. Processing unit 102 may also include cache 114. In some examples, cache 114 may be L2 cache that provides a second level of caching for processor cores 104. Processing unit 102 may also be operably coupled to memory 116.

Sequencer 106 may be configured to manage and schedule the execution of instructions amongst processor cores 104. Individual processor cores in processor cores 104 may be configured to process instructions in parallel. When a processor core in processor cores 104 is processing instructions, that processor core may be considered busy. In contrast, when a processor core in processor core 104 is not processing any instructions, that processor may be considered idle.

Clock 120 may be configured to produce a periodic clock signal at a specified clock speed that regulates the components of processing unit 102. Clock 120 may be operably coupled to processing unit 102 and may transmit the clock signal to processing unit 102. Processing unit 102 may distribute the clock signal produced by clock 120 to its components, such as processor cores 104, caches 112, and cache 114. In some examples, clock 120 may also transmit the clock signal to memory 116. Processing unit 102 may read and write data to memory 116. Caches 112 and cache 114 may cache data that are read from and are to be written to memory 116 for processor cores 104.

In accordance with techniques of the present disclosure, processing unit 102 may power collapse one or more busy processor cores of processor cores 104, without reducing the clock speed of clock 120, in response to a temperature of the processing unit 102 exceeding a temperature threshold. Temperature sensor 110 may be configured to sense the temperature of processing unit 102 and may continuously sense the temperature of processing unit 102. Temperature sensor 110, in some examples, may sense the temperature of the portion of the integrated circuit die comprising processor cores 104 or the temperature of the portion of the chip package comprising processor cores 104. Examples of temperature sensor 110 may include a thermistor, which is a resistor having a resistance that varies based on temperature.

The temperature threshold for processing unit 102 may be specified based on a variety of factors such as the desired performance of processing unit 102, the desired power consumption of processing unit 102, and the longevity of processing unit 102. For example a relatively higher temperature threshold may be specified if high performance is desired, while a relatively lower temperature may be chosen if power conservation is desired. The temperature threshold for processing unit 102 may be lower than an emergency temperature threshold where there is a great risk for imminent failure of processing unit 102 in the short term if the temperature of processing unit 102 exceeds the temperature threshold.

Processing unit 102 may read or otherwise receive the measured temperature from temperature sensor 110 and may compare the measured temperature to the temperature threshold for processing unit 102. If processing unit 102 determines that the measured temperature from temperature sensor 110 exceeds a specified temperature threshold for processing unit 102, processing unit 102 may enable power control module 108 to power collapse one or more busy processor cores of processor cores 104 to cause the temperature of processing unit 102 to decrease.

Power collapsing one or more processor cores of processor cores 104 may include power control module 108 turning off power, voltage, and/or current to the one or more processor cores as well as preventing clock signals from reaching the one or more processor cores. Power collapsing one or more processor cores of processor cores 104 may also include power collapsing one or more associated components of the one or more processor cores, such as one or more caches of caches 112 associated with the one or more processor cores. Similarly, power control module 108 may turn off power, voltage, and/or current to the one or more caches of caches 112 associated with the one or more processor cores.

To power collapse one or more processor cores of processor cores 104 of processing unit 102, processing unit 102 may communicate an indication of the one or more processor cores to be power collapsed to sequencer 106 and to power control module 108. Sequencer 106 may manage processor cores 104 so that no additional instructions are scheduled for the one or more processor cores to be power collapsed. Sequencer 106 may also save state information for the one or more processor cores' threads, save the one or more processor cores' registers, and flush one or more caches associated with the one or more processor cores. Sequencer 106 may also monitor processor cores 104 to determine when the one or more processor cores to be power collapsed have finished processing their current instructions. Sequencer 106 may, in response to determining that the one or more processor cores to be power collapsed have finished processing their current instructions, send an indication to processing unit 102 that it has finished preparing processor cores 104. In response, processing unit 102 may enable power control module 108 to power collapse the one or more processor cores including power collapsing one or more components of processing unit 102 associated with the one or more processor cores, such as one or more caches of caches 112 associated with the one or more processor cores.

While one or more cores of processor cores 104 are power collapsed, the remaining processor cores of processor cores 104 may continue to process computing instructions, and temperature sensor 110 may continue to measure the temperature of processing unit 102. Processing unit 102 may determine if the measured temperature has dropped below the temperature threshold for processing unit 102 and may, in response to the measured temperature being below the temperature threshold for processing unit 102, turn on the power collapsed one or more processor cores. Power control module 108 may turn on power, voltage, and/or current to the power collapsed one or more processor cores and its associated components, and may enable clock signals from reaching the one or more processor cores and its associated components. Power control module 108 may also send an indication to sequencer 106 that the previously power collapsed one or more processor cores, and in response sequencer 106 may schedule computing instructions to be processed by the one or more processor cores.

In some examples, processing unit 102 may not include sequencer 106. For example, processing unit 102 may be a CPU that does not include sequencer 106. In this example, an operating system executing on processing unit 102 may determine if one or more processor cores of processor cores 104 has been power collapsed and, in response, may determine not to schedule additional instructions for the power collapsed one or more processor cores. The operating system may also save the operating system state for the power collapsed one or more processor cores' threads, save the contents of registers associated with the power collapsed one or more processor cores, and may flush the caches associated with the power collapsed one or more processor cores.

The number of processor cores of processor cores 104 that power control module 108 collapses may depend on balancing the tradeoff between processing speed and how long it takes for the temperature of processing unit 102 to return below the temperature threshold. If processor cores 104 include N processor cores, power control module 108 may power collapse anywhere from 1 to N busy cores based on factors such as the rate of thermal mitigation and the operating mode of processing unit 102.

Processing unit 102 may determine which of the busy cores of processor core 104 to power collapse by rotating the sets of processor cores of processor cores 104 that power control module 108 power collapses. For example, if processor core 104 includes four processor cores, and if power control module 108 power collapses two cores each time the temperature of processing unit 102 exceeds the temperature threshold to thermally mitigate the temperature of processing unit 102, power control module 108 may rotate between two sets of two busy cores to alternately power collapse each of the two sets of two busy cores each time the temperature of processing unit 102 exceeds the temperature threshold. If, for example, processor core 104 includes eight processor cores, power control module 108 may power collapse the least recently power collapsed set of two busy cores.

As power control module 108 rotates the sets of busy cores of processor cores 104 that it power collapses, processing unit 102 may determine the time it takes for the temperature of processing unit 102 to return below the temperature threshold, and may associate the time elapsed before the temperature of processing unit 102 returns below the temperature threshold with the sets of busy cores of processor cores 104 that were power collapsed at the time. In this way, processing unit 102 may identify which set or sets of busy cores were power collapsed when the temperature of processing unit 102 took the least amount of time to return below the temperature threshold, and processing unit 102 may enable power control module 108 to power collapse the identified set or sets of busy cores to power collapse in response to the temperature of processing unit 102 exceeding the temperature threshold.

For example, processor cores 104 may include eight cores and power control module 108 may power collapse sets of two cores at a time. If processing unit 102 identifies two sets of two cores each that, when power collapsed, produces the shortest elapsed time for the temperature of processing unit 102 to cool below the temperature threshold, power control module 108 may alternately power collapse the two identified sets of cores each time the temperature of processing unit 102 exceeds the temperature threshold.

Processing unit 102 may also determine which of the busy cores of processor core 104 based at least in part on power leakage characteristics of busy processor cores of processor cores 104, so that the cores that have the most static leakage may be chosen to be power collapsed. For example, additional temperature sensors (not shown) may be placed on processing unit 102 to measure the heat dissipation and temperature of each core of processor cores 104 as processor cores 104 are in use. Based on the temperature of the individual cores of processor cores 104, power control module 108 may power collapse the cores of processor cores 104 having the highest temperature. In another example, a technician or other personnel may, after fabrication of processor cores 104, measure the static leakage of each core of processor cores 104, and such information may be used by processing unit 102 in selecting the busy cores of processor cores 104 that power control module 108 power collapses based on the static leakage of the processor cores.

To power collapse one or more processor cores of processor cores 104, processing unit 102 may indicate to sequencer 106 the processor cores of processor cores 104 to be power collapsed by power control module 108. In response, sequencer 106 may schedule the instructions to be performed by processor cores 104 so that the processor cores of processor cores 104 to be collapsed by power control module 108 do not receive any additional instructions to process besides the instructions currently being processed by those processor cores.

In response to sequencer 106 determining that the processor cores of processor cores 104 to be power collapsed by power control module 108 have finished processing their current instructions, sequencer 106 may send an indication to processing unit 102 that those processor cores of processor cores 104 can be power collapsed. In response to receiving the indication from sequencer 106, processing unit 102 may enable power control module 108 to shut off power to the processor cores of processor cores 104 that processing unit 102 had previously determined to power collapse.

Figure 2:
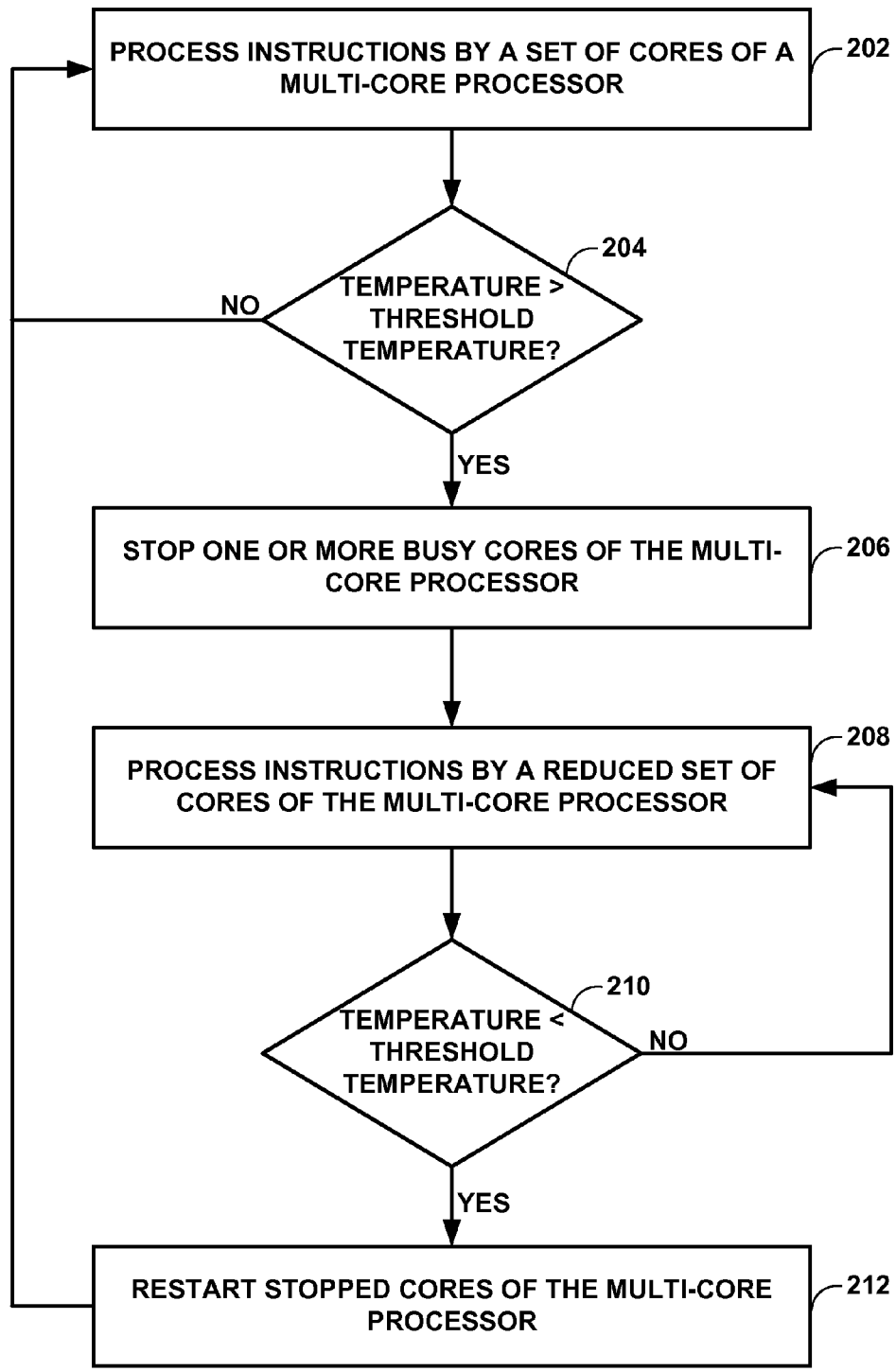
FIG. 2 is a flow chart illustrating an example method of thermally mitigating a multi-core processor according to some aspects of the present disclosure.

FIG. 2 is a flow chart illustrating an example method of thermally mitigating a multi-core processor according to some aspects of the present disclosure. As shown in FIG. 2, processor cores 104 of a multi-core processor 102 may be busy processing instructions to execute a software application, processing graphics instructions to render a graphical scene, processing mathematical operations on a series of data samples for a digital signal processor, and the like (202). As processor cores 104 processes instructions, processor cores 104 may dissipate heat, including heat produced by dynamic power dissipation and heat from static leakage of processor cores 104.

Temperature sensor 110 may measure the temperature of multi-core processor 102 and may communicate the measured temperature to power control module 108, and power control module 108 may determine if the measured temperature of multi-core processor 102 is higher than a threshold temperature (204). If the measured temperature of multi-core processor 102 does not exceed the threshold temperature, processor cores 104 of multi-core processor 102 may continue to process instructions (202).

If the measured temperature of multi-core processor 102 does exceed the threshold temperature, multi-core processor 102 may power collapse one or more of the processor cores 104 (206). Power collapsing a processor core may include power collapsing supporting hardware components associated with the processor core, such as caches, texture pipelines, rendering buffers, and the like for the power collapsed processor core.

Processing unit 102 may employ intelligent strategies to determine which processor cores of processor cores 104 are power collapsed. In one strategy, processing unit 102 may rotate the processor cores of processor cores 104 that are power collapsed each time the temperature of processing unit 102 exceeds its temperature threshold. For example, processor cores 104 may comprise four processor cores and a set of two processor cores may be power collapsed each time the temperature exceeds the temperature threshold. Processing unit 102 may, in response to its temperature exceeding its temperature threshold, power collapse a first set of two processor cores of processor cores 104. The next time processing unit 102's temperature exceeds its temperature threshold, processing unit 102 may collapse a second set of two processor cores of processor cores 104 that are different than the first set of two processor cores 104. In other strategies, processing unit 102 may determine to power collapse the processor core or processor cores of processor cores 104 that have the greatest amount of static leakage, or processing unit 102 may determine to power collapse the processor core or processor cores of processor cores 104 that drops in temperature the fastest after being power collapsed.

The reduced set of processor cores 104 that remains powered on may continue to process instructions (208), and temperature sensor 110 may continue to measure the temperature of multi-core processor 102. Temperature sensor 110 may communicate the measured temperature to power control module 108, and power control module 108 may determine if the measured temperature of multi-core processor 102 is lower than a threshold temperature (210). If the measured temperature of multi-core processor 102 continues to exceed the threshold temperature, the reduced set of processor cores 104 remains powered on may continue to process instructions (208). If the measured temperature of multi-core processor 102 no longer exceeds the threshold temperature, power control module 108 may power on the previously power collapsed processor cores of processor cores 104 (212), and the full set of processor cores of processor cores 104 may process instructions (202).

Figure 3A:
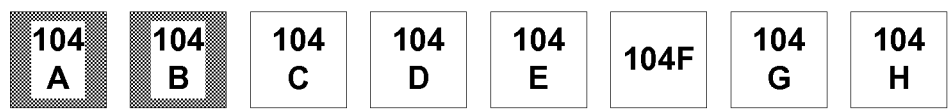
FIGS. 3A-3D are conceptual diagrams illustrating power collapsing of busy cores of a multi-core processor on a rotating basis in accordance with aspects of the present disclosure.
Figure 3B:
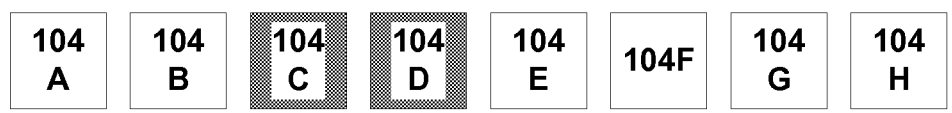
Figure 3C:
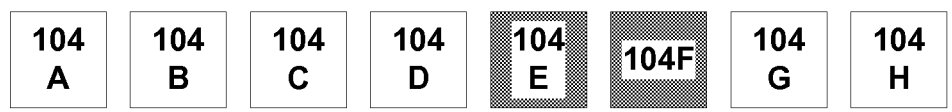
Figure 3D:
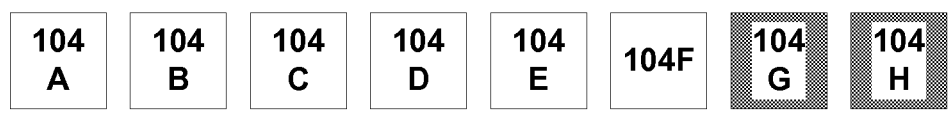

FIGS. 3A-3D are conceptual diagrams illustrating power collapsing of busy cores of a multi-core processor on a rotating basis amongst the cores in accordance with aspects of the present disclosure. In the example shown in FIGS. 3A-3D, processor cores 104 may comprise eight processor cores 104A-104H, and two of the processor cores may be shut off at a time when the temperature of the processing unit exceeds the temperature threshold. As shown in FIG. 3A, when the temperature of processing unit 102 comprising processor cores 104 exceeds a temperature threshold, processing unit 102 may turn off two processor cores 104A and 104B. As shown in FIG. 3B, after processing unit 102 turns processor cores 104A and 104B back on in response to its temperature falling below the temperature threshold, in the next instance of when the temperature of processing unit 102 exceeds the temperature threshold, the processing unit 102 may rotate the processor cores that are turned off for thermal mitigation by turning off two processor cores 104C and 104D. Similarly, as shown in FIG. 3C, after processing unit 102 turns processor cores 104C and 104D back on in response to its temperature falling below the temperature threshold, in the next instance of when the temperature of processing unit 102 exceeds the temperature threshold, the processing unit 102 may rotate the processor cores that are turned off for thermal mitigation by turning off two processor cores 104E and 104F. Likewise, as shown in FIG. 3D, after processing unit 102 turns processor cores 104E and 104F back on in response to its temperature falling below the temperature threshold, in the next instance of when the temperature of processing unit 102 exceeds the temperature threshold, the processing unit 102 may rotate the processor cores that are turned off for thermal mitigation by turning off two processor cores 104G and 104H.

FIGS. 4A-4D are conceptual diagrams illustrating power collapsing of busy cores of a multi-core processor via an intelligent rotating algorithm, in accordance with aspects of the present disclosure. Processing unit 102 may determine which processor cores or sets of processor cores may, when turned off, cool down faster compared to the other processor cores of processor cores 104. Upon processing unit 102 making such a determination of the cool down speed of the processor cores, processing unit 102 may shut off those processor cores in response to the temperature of processing unit 102 exceeding the temperature threshold.

Figure 4A:
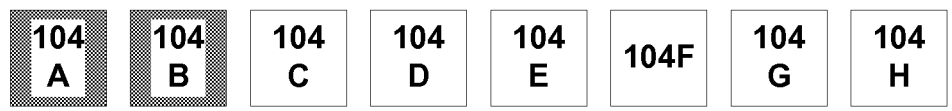
FIGS. 4A-4D are conceptual diagrams illustrating power collapsing of busy cores of a multi-core processor via an intelligent rotating algorithm, in accordance with aspects of the present disclosure.
Figure 4B:
Figure 4C:
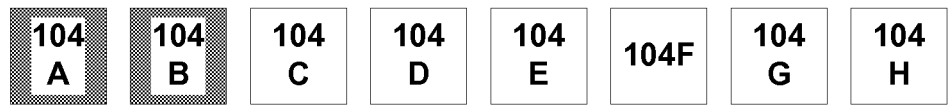
Figure 4D:
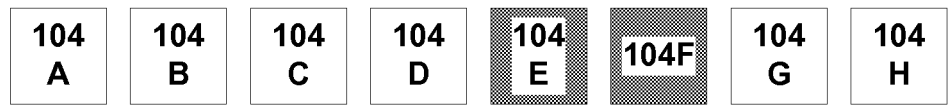

In the example shown in FIGS. 4A-4D, the set of processor cores 104A and 104B and the set of processor cores 104E and 104F are the sets of processor cores having temperatures that decrease the fastest when they are switched from being on and busy to being off. Based at least in part on that information, processing unit 102 may rotate between turning off the set of processor cores 104A and 104B and the set of processor cores 104C and 104D if the temperature of processing unit 102 exceeds the temperature threshold. As shown in FIG. 4A, when the temperature of processing unit 102 comprising processor cores 104 exceeds the temperature threshold, processing unit 102 may turn off a first set of two processor cores 104A and 104B. As shown in FIG. 4B, after processing unit 102 turns processor cores 104A and 104B back on in response to processing unit 102's temperature falling below the temperature threshold, in the next instance of when the temperature of processing unit 102 exceeds the temperature threshold, the processing unit 102 may turning off a second set of two processor cores 104E and 104F. As shown in FIG. 4C, because processing unit 102 determines that sets of processor cores 104A and 104B and processor cores 104E and 104F are the most efficient sets of processor cores at cooling down upon being turned off, after processing unit 102 turns processor cores 104E and 104F back on in response to processing unit 102's temperature falling below the temperature threshold, the processing unit 102 may rotate back to turning off processor cores 104A and 104B in the next instance of when the temperature of processing unit 102 exceeds the temperature threshold. Similarly, as shown in FIG. 4D, after processing unit 102 turns processor cores 104E and 104F back on in response to its temperature falling below the temperature threshold, in the next instance of when the temperature of processing unit 102 exceeds the temperature threshold, the processing unit 102 may rotate the processor cores that are turned off for thermal mitigation by turning off two processor cores 104A and 104B. As such, by determining the processor cores that cool down the fastest after being power collapsed, and by power collapsing the sets of processor cores that cool down the fastest, processing unit 102 may enable its temperature to more quickly drop below the temperature threshold.

Figure 5:
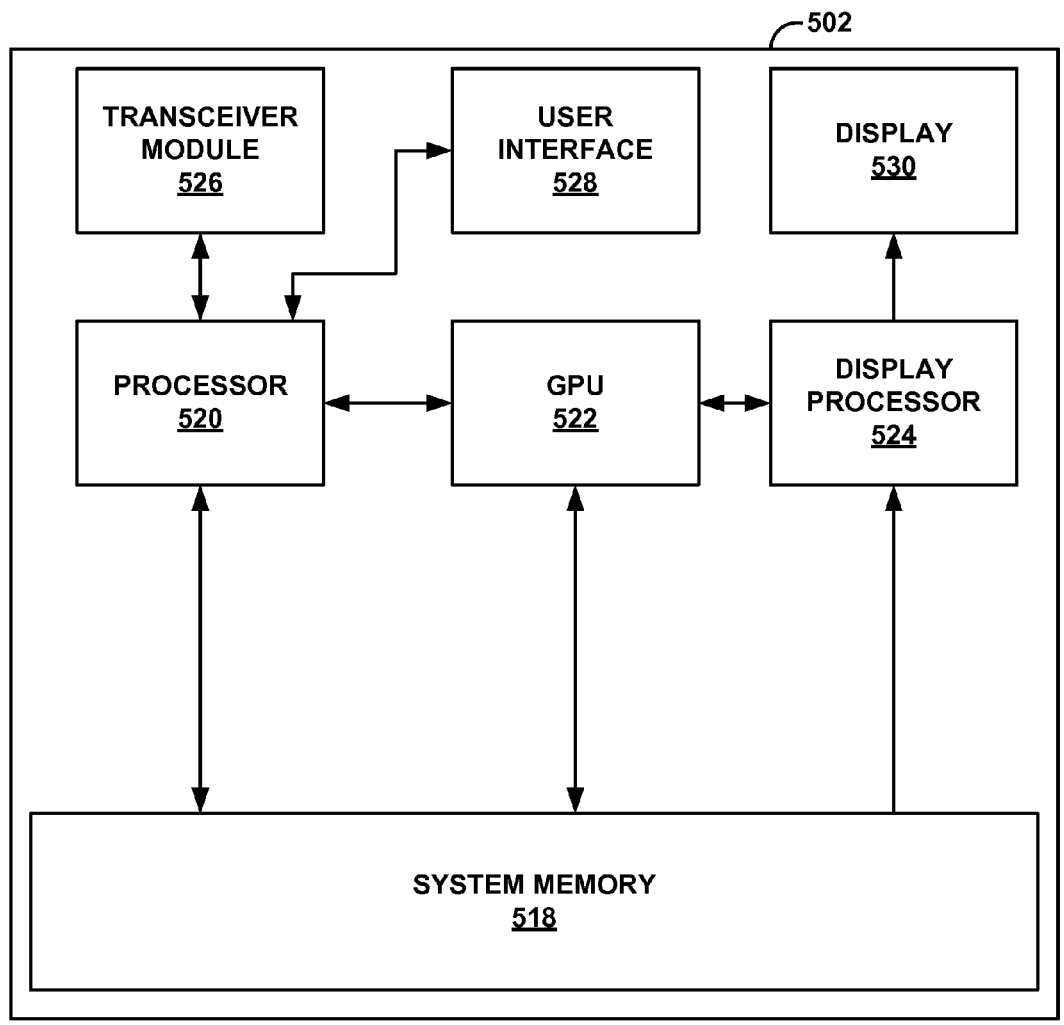
FIG. 5 is a block diagram illustrating an example of a device that may be configured to implement one or more aspects of this disclosure.

FIG. 5 is a block diagram illustrating an example of a device that may be configured to implement one or more aspects of this disclosure. For example, FIG. 5 illustrates device 502. Examples of the device 502 include, but are not limited to, video devices, media players, set-top boxes, wireless handsets such as mobile telephones and so-called smartphones, personal digital assistants (PDAs), desktop computers, laptop computers, gaming consoles, video conferencing units, tablet computing devices, and the like.

In the example of FIG. 5, device 502 may include processor 520, system memory 518, and GPU 522. Processor 520 and GPU 522 may be similar to processing unit 102 shown in FIG. 1, and system memory 518 may be similar to memory 116 shown in FIG. 1. Device 502 may also include display processor 524, transceiver module 526, user interface 528, and display 530. Transceiver module 526 and display processor 524 may both be part of the same integrated circuit (IC) as processor 520 and/or GPU 522, may both be external to the IC or ICs that include processor 520 and/or GPU 522, or may be formed in the IC that is external to the IC that includes processor 520 and/or GPU 522.

Device 502 may include additional modules or units not shown in FIG. 5 for purposes of clarity. For example, device 502 may include a speaker and a microphone, neither of which are shown in FIG. 5, to effectuate telephonic communications in examples where device 502 is a mobile wireless telephone, or a speaker where device 502 is a media player. Device 502 may also include a video camera. Furthermore, the various modules and units shown in device 502 may not be necessary in every example of device 502. For example, user interface 528 and display 530 may be external to device 502 in examples where device 502 is a desktop computer or other device that is equipped to interface with an external user interface or display.

Examples of user interface 528 include, but are not limited to, a trackball, a mouse, a keyboard, and other types of input devices. User interface 528 may also be a touch screen and may be incorporated as a part of display 530. Transceiver module 526 may include circuitry to allow wireless or wired communication between device 502 and another device or a network. Transceiver module 526 may include modulators, demodulators, amplifiers and other such circuitry for wired or wireless communication.

In some examples, GPU 522 may store a fully formed image in system memory 518. Display processor 524 may retrieve the image from system memory 518 and output values that cause the pixels of display 530 to illuminate to display the image. Display 530 may the display of device 502 that displays the image content generated by GPU 522. Display 530 may be a liquid crystal display (LCD), an organic light emitting diode display (OLED), a cathode ray tube (CRT) display, a plasma display, or another type of display device.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" and "processing unit," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method for thermally mitigating a multi-core processor, comprising:
    power collapsing sets of one or more busy processor cores of a multi-core processor on a rotating basis amongst cores of the multi-core processor without reducing clock speed of the multi-core processor in response to instances of a temperature of the multi-core processor exceeding a temperature threshold, including determining an elapsed time for the temperature of the multi-core processor to fall below the temperature threshold responsive to power collapsing each set of the one or more busy processor cores to determine a set of the one or more busy processor cores that, when power collapsed, produces a shortest elapsed time for the temperature of the multi-core processor to fall below the temperature threshold; and
    in response to the temperature of the multi-core processor exceeding the temperature threshold at a subsequent instance, power collapsing the set of the one or more busy processor cores that, when power collapsed, produces the shortest elapsed time for the temperature of the multi-core processor to fall below the temperature threshold.

2. The method of claim 1, further comprising:
    determining the set of one or more busy processor cores of the multi-core processor to power collapse based on power leakage characteristics of the one or more busy processor cores of the multi-core processor.

3. The method of claim 1, further comprising:
    determining the set of one or more busy processor cores of the multi-core processor to power collapse based on a cool down speed of the set of one or more busy processor cores of the multi-core processor.

4. The method of claim 1, wherein the temperature threshold is less than an emergency temperature threshold.

5. The method of claim 1, wherein power collapsing the set of one or more busy processor cores of the multi-core processor further comprises:
determining, by a sequencer, not to schedule instructions for the set of one or more busy processor cores to process.

6. The method of claim 1, wherein power collapsing the set of one or more busy processor cores further comprises:
power collapsing one or more caches associated with the set of one or more busy processor cores.

7. The method of claim 1, further comprising:
sensing the temperature of the multi-core processor.

8. An apparatus comprising:
a multi-core processor; and
a power control module configured to:
power collapse sets of one or more busy processor cores of the multi-core processor on a rotating basis amongst cores of the multi-core processor without reducing clock speed of the multi-core processor in response to instances of a temperature of the multi-core processor exceeding a temperature threshold, including determining an elapsed time for the temperature of the multi-core processor to fall below the temperature threshold responsive to power collapsing each set of the one or more busy processor cores to determine a set of the one or more busy processor cores that, when power collapsed, produces a shortest elapsed time for the temperature of the multi-core processor to fall below the temperature threshold; and
in response to the temperature of the multi-core processor exceeding the temperature threshold at a subsequent instance, power collapse the set of the one or more busy processor cores that, when power collapsed, produces the shortest elapsed time for the temperature of the multi-core processor to fall below the temperature threshold.

9. The apparatus of claim 8, wherein the power control module is further configured to determine the set of one or more busy processor cores of the multi-core processor to power collapse based on power leakage characteristics of the set of one or more busy processor cores of the multi-core processor.

10. The apparatus of claim 8, wherein the power control module is further configured to determine the set of one or more busy processor cores of the multi-core processor to power collapse based on a cool down speed of the set of one or more busy processor cores of the multi-core processor.

11. The apparatus of claim 8, wherein the temperature threshold is less than an emergency temperature threshold.

12. The apparatus of claim 8, further comprising:
a sequencer configured to determine not to schedule instructions for the set of one or more busy processor cores to process.

13. The apparatus of claim 8, wherein power collapse the set of one or more busy processor cores further comprises:
power collapse one or more caches associated with the set of one or more busy processor cores.

14. The apparatus of claim 8, further comprising:
a temperature sensor configured to sense the temperature of the multi-core processor.

15. An apparatus comprising:
means for power collapsing sets of one or more busy processor cores of a multi-core processor on a rotating basis amongst cores of the multi-core processor without reducing clock speed of the multi-core processor in response to instances of a temperature of the multi-core processor exceeding a temperature threshold, including determining an elapsed time for the temperature of the multi-core processor to fall below the temperature threshold responsive to power collapsing each set of the one or more busy processor cores to determine a set of the one or more busy processor cores that, when power collapsed, produces a shortest elapsed time for the temperature of the multi-core processor to fall below the temperature threshold; and
means for power collapsing the set of the one or more busy processor cores that, when power collapsed, produces the shortest elapsed time for the temperature of the multi-core processor to fall below the temperature threshold, in response to the temperature of the multi-core processor exceeding the temperature threshold at a subsequent instance.

16. The apparatus of claim 15, further comprising:
means for determining the set of one or more busy processor cores of the multi-core processor to power collapse based on power leakage characteristics of the set of first one or more busy processor cores of the multi-core processor.

17. The apparatus of claim 15, further comprising:
means for determining the set of first one or more busy processor cores of the multi-core processor to power collapse based on a cool down speed of the set of one or more busy processor cores of the multi-core processor.

18. The apparatus of claim 15, wherein the temperature threshold is less than an emergency temperature threshold.

19. The apparatus of claim 15, wherein the means for power collapsing the set of one or more busy processor cores of the multi-core processor further comprises:
means for determining not to schedule instructions for the set of one or more busy processor cores to process.

20. The apparatus of claim 15, wherein the means for power collapsing the set of one or more busy processor cores further comprises:
means for power collapsing one or more caches associated with the set of one or more busy processor cores.

21. A non-transitory computer-readable storage medium storing instructions that, when executed, cause one or more a programmable processors to:
power collapse sets of one or more busy processor cores of a multi-core processor on a rotating basis amongst cores of the multi-core processor without reducing clock speed of the multi-core processor in response to instances of a temperature of the multi-core processor exceeding a temperature threshold, including determining an elapsed time for the temperature of the multi-core processor to fall below the temperature threshold responsive to power collapsing each set of the one or more busy processor cores to determine a set of the one or more busy processor cores that, when power collapsed, produces a shortest elapsed time for the temperature of the multi-core processor to fall below the temperature threshold; and
in response to the temperature of the multi-core processor exceeding the temperature threshold at a subsequent instance, power collapse the set of the one or more busy processor cores that, when power collapsed, produces the shortest elapsed time for the temperature of the multi-core processor to fall below the temperature threshold.

22. The non-transitory computer-readable storage medium of claim 21, wherein the instructions further cause the one or more programmable processors to:

determine the set of one or more busy processor cores of the multi-core processor to power collapse based on power leakage characteristics of the set of one or more busy processor cores of the multi-core processor.

23. The non-transitory computer-readable storage medium of claim 21, wherein the instructions further cause the one or more programmable processors to:
determine the set of one or more busy processor cores of the multi-core processor to power collapse based on a cool down speed of the set of one or more busy processor cores of the multi-core processor.

24. The non-transitory computer-readable storage medium of claim 21, wherein the temperature threshold is less than an emergency temperature threshold.

25. The non-transitory computer-readable storage medium of claim 21, wherein the instructions further cause the one or more programmable processors to:
determine, by a sequencer, not to schedule instructions for the set of one or more busy processor cores to process.

26. The non-transitory computer-readable storage medium of claim 21, wherein the instructions further cause the one or more programmable processors to:
power collapse one or more caches associated with the set of one or more busy processor cores.

* * * * *